June 19, 1928.
F. L. HUNT ET AL
1,674,550
LIQUID LEVEL
Filed Oct. 31, 1924
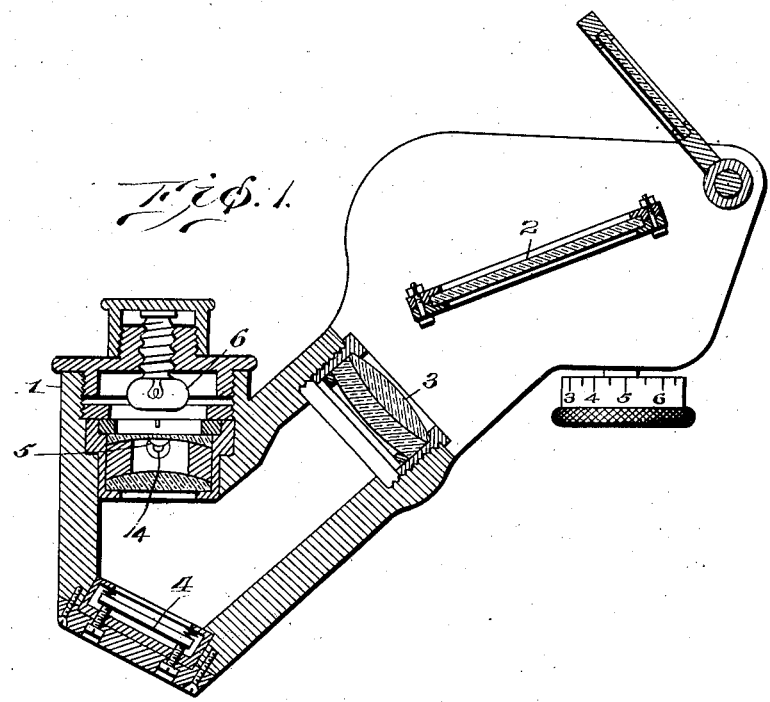
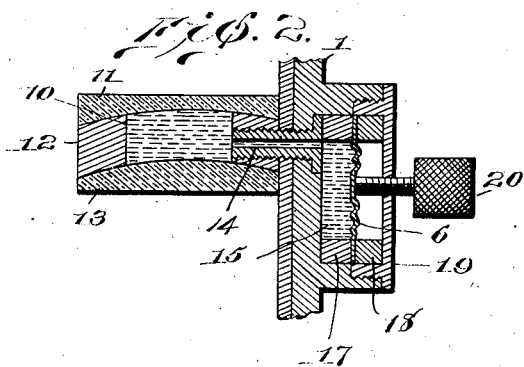
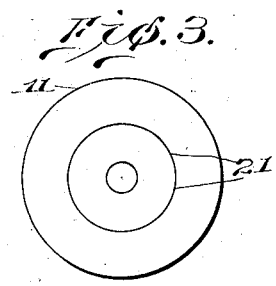
Inventor
Franklin L. Hunt
Karl H. Beij
By Robert H. Young
Attorney Patented June 19, 1928.

1,674,550

UNITED STATES PATENT OFFICE.

FRANKLIN L. HUNT AND KARL H. BEIJ, OF WASHINGTON, DISTRICT OF COLUMBIA.

LIQUID LEVEL.

Original application filed June 3, 1921, Serial No. 474,582. Divided and this application filed October 31, 1924. Serial No. 746,998.

This invention relates to liquid levels and more particularly to those types of bubble tubes or bubble lenses used in sextants, range finders, transits and the like, although the use of this invention is not necessarily restricted to these types of instruments.

It is the object of this invention to provide means for compensating for temperature changes affecting the levelling bubble. In instruments of precision in which the ordinary sealed bubble level is used, the size of the bubble is materially affected by heat and cold and its size is sometimes so changed as to make the bubble level useless for its purpose. It is to this end that we provide novel means for regulating the size of the bubble for all conditions of temperature.

The invention is illustrated in the accompanying drawing as applied, by way of example, to a sextant using a bubble lens. The particular sextant illustrated forms the subject matter of our co-pending application, Serial No. 474,582, now Patent No. 1,531,615, filed June 3, 1921, the present application being a division of said co-pending application.

In the accompanying drawings

Fig. 1 is a vertical, longitudinal section through a sextant using a bubble level which embodies our invention.

Fig. 2 is a section through the bubble level and the adjusting or regulating means.

Fig. 3 is a plan view of the level bubble lens showing the reference marks.

Referring more particularly to the drawings, it is seen that the frame 1 of the sextant supports an adjustable index mirror 2, a collimating lens 3, a bubble mirror 4 and a level bubble 5, thus forming the optical system of the sextant. In case of night observations, the electric light 6 is used to illuminate the level bubble.

The construction of the level bubble and its adjustment is shown more clearly in Figure 2. The bubble chamber 10 is formed by two circular top and bottom lenses 11 and 13 and an intermediate annular spacer 12, the lenses 11 and 13 being of glass or other transparent material. On the frame 1 and at one side of the bubble chamber, a reservoir chamber 15 is formed. This chamber is always in communication with the bubble chamber 10 by means of the tubular connection or hollow screw 14. A flexible diaphragm 16, preferably of metal, is placed in the reservoir chamber 15, in a medial position therein and clamped between the rings 17 and 18. The outer side of the chamber 15 is closed by the cap 19. An adjusting screw 20 is threaded through cap 19 and bears against the diaphragm 16. The top lens 11 may be provided with concentric circles 21 etched in the glass which may be used as reference marks to accurately center the bubble and also to aid in adjusting the size of the bubble.

The bubble chamber and reservoir are filled with a suitable fluid or liquid, allowing a small air space, however, to form the level bubble 5, as shown in Figure 1. Upon initial installation, the diaphragm 16 is distorted and placed under tension by adjusting screw 20. It is apparent by such a construction that the amount of fluid or liquid in the chamber 10 may be varied so as to regulate the size of bubble 5 by merely turning the adjusting screw 20 either in or out. By such a construction it is possible to have the bubble of a certain size, for example, the size of the inner reference mark 21, for all readings whether taken at night or during the daytime.

We claim—

1. An adjustable liquid level comprising a bubble chamber, a reservoir chamber, said bubble and reservoir chambers having a communicating connection, a flexible diaphragm in said reservoir, and an adjusting screw for distorting said diaphragm.

2. In a liquid level, the combination of a bubble chamber, and temperature compensating means comprising an auxiliary reservoir, a diaphragm in said reservoir, and means for causing movement of said diaphragm in both directions.

In testimony whereof we affix our signatures.

FRANKLIN L. HUNT.
KARL H. BEIJ.